(12) United States Patent
Dickinson et al.

(10) Patent No.: US 9,649,993 B1
(45) Date of Patent: May 16, 2017

(54) ONE STEP ASSEMBLY FASTENER CLIP

(71) Applicant: Termax Corporation, Lake Zurich, IL (US)

(72) Inventors: Daniel James Dickinson, Lincolnshire, IL (US); Michael Walter Smith, Palatine, IL (US); Michael Tirrell, Volo, IL (US); John Clasen, Crystal Lake, IL (US)

(73) Assignee: TERMAX CORPORATION, Lake Zurich (IL)

( * ) Notice: Subject to any disclaimer, the term of this patent is extended or adjusted under 35 U.S.C. 154(b) by 0 days.

(21) Appl. No.: 14/990,792

(22) Filed: Jan. 8, 2016

Related U.S. Application Data

(60) Provisional application No. 62/207,911, filed on Aug. 20, 2015.

(51) Int. Cl.
| | | |
|---|---|---|
| *B62D 24/02* | (2006.01) | |
| *B60R 13/02* | (2006.01) | |
| *B60R 13/00* | (2006.01) | |
| *B62D 24/00* | (2006.01) | |
| *B62D 27/06* | (2006.01) | |
| *B62D 29/04* | (2006.01) | |

(52) U.S. Cl.
CPC .......... *B60R 13/0206* (2013.01); *B60R 13/00* (2013.01); *B62D 24/00* (2013.01); *B62D 27/06* (2013.01); *B62D 29/048* (2013.01)

(58) Field of Classification Search
CPC .... B01D 35/147; B01D 35/153; B01D 35/16; H01L 2924/0002; B60R 9/06; H04B 1/082; H05K 9/0047; H05K 13/00; H05K 9/0007; Y10T 29/49002

USPC ..................... 296/35.1; 220/265; 222/153.06
See application file for complete search history.

(56) References Cited

U.S. PATENT DOCUMENTS

| | | | | | |
|---|---|---|---|---|---|
| 4,122,583 | A | * | 10/1978 | Grittner | B60R 13/0206 24/297 |
| 5,366,332 | A | * | 11/1994 | Murphy | F16B 5/0642 411/342 |
| 6,835,037 | B2 | * | 12/2004 | Lowry | F16B 37/02 24/458 |
| 6,857,168 | B2 | * | 2/2005 | Lubera | B60N 3/026 24/293 |
| 6,928,705 | B2 | * | 8/2005 | Osterland | B60R 13/0206 24/289 |
| 7,051,408 | B2 | * | 5/2006 | De Azevedo | F16B 2/241 24/289 |
| 7,287,945 | B2 | * | 10/2007 | Lubera | F16B 5/065 24/295 |
| 7,311,229 | B1 | * | 12/2007 | Wrigley | B67D 3/043 222/518 |
| 7,572,089 | B2 | * | 8/2009 | Lowry | F16B 37/02 411/182 |

(Continued)

*Primary Examiner* — Kiran B Patel

(57) ABSTRACT

A fastener clip assembly including a first part and a second part. The first part is configured to engage and be secured to a first article, where the second part is configured to engage and be secured to a second article, and where the first part is configured to engage and be secured to the second part. The first part is pre-attached to the second part with a frangible link, where the first part is configured to engage and be secured to the second part based at least upon breaking the frangible link, and where breaking the frangible link is based at least upon pressing the first part toward the second part.

12 Claims, 13 Drawing Sheets

(56) References Cited

U.S. PATENT DOCUMENTS

| | | | |
|---|---|---|---|
| 9,080,588 B2* | 7/2015 | Diez Herrera | B60N 3/026 |
| 9,488,209 B2* | 11/2016 | Camus | F16B 21/075 |
| 9,533,718 B2* | 1/2017 | Smith | B62D 27/02 |
| 2002/0194710 A1* | 12/2002 | Dickinson | F16B 5/0614 |
| | | | 24/295 |
| 2005/0105987 A1* | 5/2005 | Giugliano | F16B 5/065 |
| | | | 411/508 |
| 2006/0290155 A1* | 12/2006 | Smith | B60R 11/00 |
| | | | 296/29 |
| 2008/0086850 A1* | 4/2008 | Smith | B60R 13/0206 |
| | | | 24/289 |
| 2008/0098576 A1* | 5/2008 | Smith | B60R 11/00 |
| | | | 24/297 |
| 2008/0289155 A1* | 11/2008 | Kim | B60J 3/0213 |
| | | | 24/295 |
| 2010/0026028 A1* | 2/2010 | Smith | B60R 13/0206 |
| | | | 296/29 |
| 2011/0163562 A1* | 7/2011 | Smith | B60R 13/0206 |
| | | | 296/1.07 |
| 2014/0263895 A1* | 9/2014 | Dickenson | B60R 13/0206 |
| | | | 248/206.5 |
| 2015/0251624 A1* | 9/2015 | Dickinson | B60R 21/216 |
| | | | 29/525.08 |
| 2015/0321622 A1* | 11/2015 | Dickinson | B60R 13/0206 |
| | | | 24/458 |
| 2016/0016522 A1* | 1/2016 | Smith | F16B 37/043 |
| | | | 296/35.1 |
| 2016/0138629 A1* | 5/2016 | Flynn | F16B 19/1081 |
| | | | 411/57.1 |
| 2016/0144801 A1* | 5/2016 | Huelke | B60N 3/026 |
| | | | 24/295 |
| 2016/0229368 A1* | 8/2016 | Dickinson | B60R 13/0275 |
| 2016/0375840 A1* | 12/2016 | Dickinson | B60R 13/00 |
| | | | 24/295 |

* cited by examiner

ONE STEP ASSEMBLY FASTENER CLIP

A. RELATED APPLICATIONS

This is a continuation in part application claiming priority from

| Appl. No. | Filing Date | Docket No. | Title | Continuity Type |
|---|---|---|---|---|
| 62207911 | Aug. 8, 2015 | P049 | Adaptive Sealing Fastener | Claims Benefit of Provisional |
| 62263869 | Dec. 7, 2015 | P049-B | Two Piece Fastener | Claims Benefit of Provisional |

The above-referenced patents and/or patent applications are hereby incorporated by reference herein in their entirety.

A. BACKGROUND

The invention relates generally to devices for fastening objects, and more particularly to a fastener clip assembly for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, headliner, or any interior trim piece. Additionally, the panel may be any suitable exterior body panel, such as a fender, bumper, quarter panel, or door panel. The chassis of the vehicle may include any substrate, plate, body panel, structural framework, chassis component or subcomponent, wall, or any suitable object.

These body panels typically are required to attach to the chassis of an automobile with a relatively low level of insertion force while providing a high level of extraction force suitable to maintain attachment of the panel to the chassis. However, these conventional fastener devices instead provide approximately relatively equal levels of insertion and extraction force. Further, conventional fasteners typically do not adequately secure the panel to the vehicle chassis having sheet metal with different curvature or thicknesses throughout. In addition, conventional fasteners are not suitable under a variety of environmental conditions, such as in the presence of vibration at various levels of amplitude and frequency. For example, the fastener device should prevent or minimize the amount of buzzing, rattling, or any other type of noise that may cause attention to the occupants of the vehicle or otherwise weaken the attachment. In addition, conventional fasteners do not adequately accommodate various levels of production tolerances, such as various dimensions amongst, for example, the body panels as well as the vehicle chassis. Thus, conventional fastener devices typically do not adequately fasten to a range of sheet metal thicknesses and do not minimize or eliminate buzzing and rattling and do not sufficiently accommodate variations in production tolerances.

Fastener clips, such as metal spring fasteners, are known for attaching body panels to an automobile chassis. For example, fastener clips are known having a base plate and four stepped arms extending from the base plate. Each stepped arm includes four incremental steps (stair-steps) suitable for engaging a slot in a vehicle chassis with one of the steps on each arm. The incremental steps allow for engagement, however, in only one of the four discrete step positions rather than over a continuous range of engagement positions. Further, each step has a relatively large rise and run so that, once inserted, movement of the fastener clip within the range of a step size may occur, resulting in wear and/or the generation of noise, including buzzing and rattling as a result of vibrations occurring within the vehicle. In addition, the steps typically cut onto each arm during manufacture and require twisting of each wing on the fastener clip in order to engage the slot in the vehicle chassis. As a result, only an edge or a portion of an edge of each of the steps engages the hole in the vehicle slot.

If the sheet metal varies in thickness or if tolerances in production of the slot in the vehicle chassis or in the trim-piece exist, for example, then engagement of one portion of the hole in the chassis with one of the arms may not provide suitable frictional engagement or otherwise result in movement. Further, less than all four of the arms will make engagement with the slot of the vehicle chassis. Twisting of the body panel will be likely more prevalent because less than four contact points are actually made with the slot of the vehicle chassis. As a result, wear, squeaks, rattles, buzzing, corrosion and loss of elasticity and loss of sealing may result, especially after years of vehicle operation and exposure to vibration and other environmental conditions.

B. BRIEF DESCRIPTION OF THE DRAWINGS

Other objects and advantages of the invention may become apparent upon reading the detailed description and upon reference to the accompanying drawings.

Figure 1:
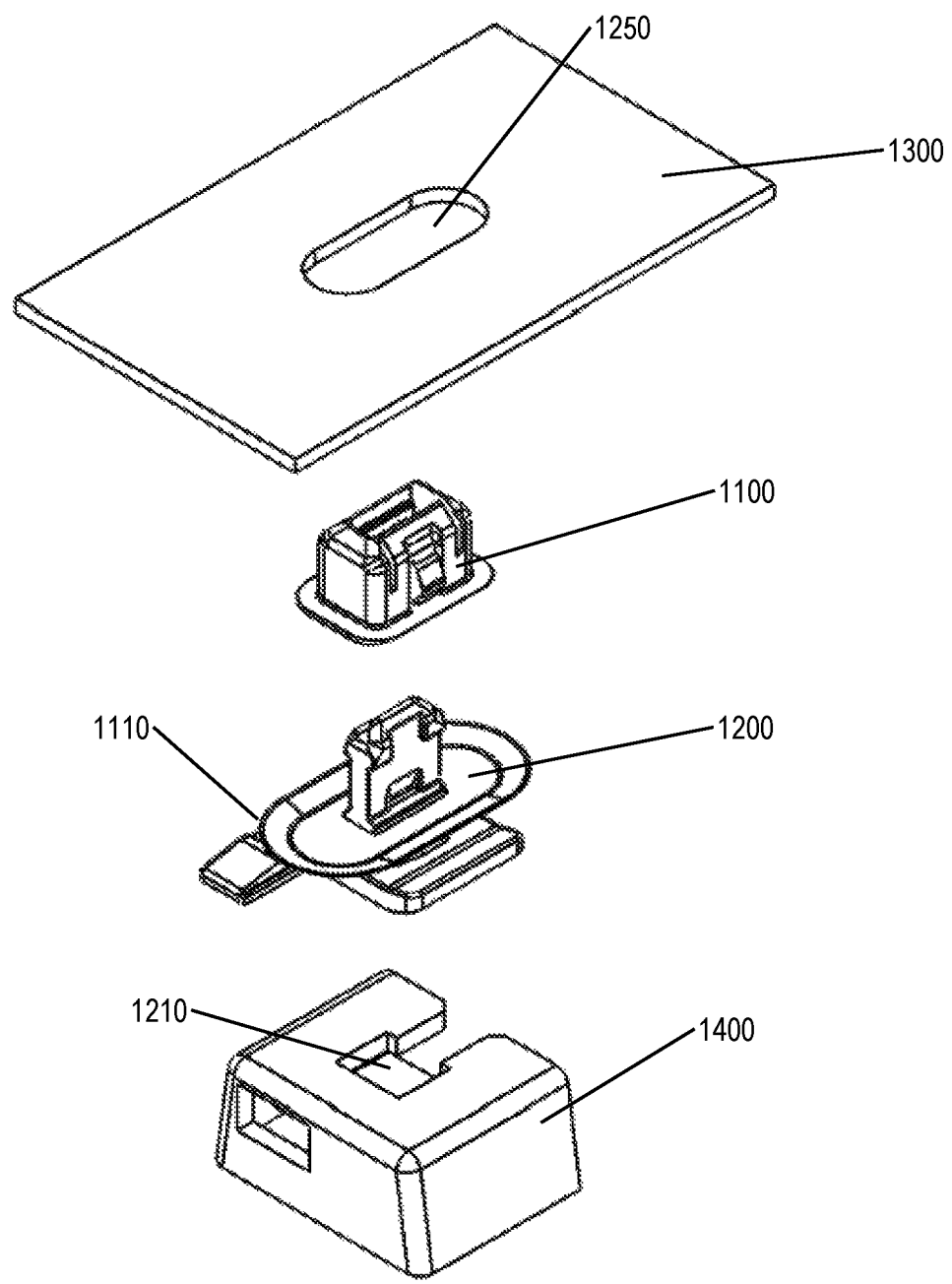
FIG. 1 is an exploded view of a first fastener clip assembly, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

A fastener clip includes first and second feet and a first and second pair of laterally offset legs extending from the first and second feet. At least one first wing extends from the first pair of laterally offset legs. The at least one first wing has an engagement region. At least one second wing extends from the second pair of laterally offset legs. The at least one second wing also has an engagement region. The engagement regions include a depressed portion operable to adapt to variations or movement of a slot. In some embodiments, the fastener clip may be made primarily of metal—such as spring steel, carbon spring steel, full hard stainless steel, etc. In other embodiments, hard plastic material may be used. Other suitable materials may also be used.

The fastener clip may be configured to fit over a carrier. In some embodiments, the carrier may be made from various plastic or rubber compositions. The carrier may be configured to provide additional support to the fastener clip while providing the fastener clip with some give. In some embodiments, the carrier enables the assembly of the clip and the carrier to have more resistance to rattling, buzzing, and general vibration. In some embodiments, the carrier may comprise a top and a bottom seal configured to form a seal with a top and a bottom surface respectively, where the top and the bottom surfaces are the surfaces that are being fastened using the fastener clip.

In some embodiments, the carrier may be made of plastic nylon, polyoxymethylene (POM, also known as acetal), ABS, Polypropylene, rubber materials of various hardness, etc. In some embodiments, the carrier may be injection molded.

In some embodiments, the carrier may be configured to attach to a clip carrier housing (or housing for short) that may be, for example, attached to or be part of a body panel (one of the parts being fastened).

In some embodiments, the fastener clip assembly may have a high level of extraction force, yet the fastener clip may securely and relatively easily facilitate attachment of a body panel, such as an interior or exterior body panel, with the first engagement structure such as the vehicle chassis. The fastener clip may also be suitable for use in heavy-duty applications such as visor mounting, headliners, and pull-handle fasteners. The wings have an engagement region, size, such as a width, length, thickness, and pivot point to provide very high extraction force levels while the insertion force level is relatively low.

Further, the fastener clip may be used with different sheet metal thicknesses and curvatures. For example, a vehicle may have different sheet metal thicknesses at various parts of the vehicle. The range of slot thicknesses varies continuously from a minimum thickness to a maximum thickness. For example, the minimum thickness may be 0.25 mm or less and the maximum thickness may be 6.0 mm or more. The fastener clip is configured to be inserted into the slot defined in a first engagement structure, such as a vehicle chassis. Since the fastener clip is configured to adapt automatically to different sheet metal thicknesses and curvatures, the same fastener clip may be used throughout the vehicle thus eliminating the need for specific fastener clips for specific slot thicknesses.

The engagement portion, along with an optional engagement tab on each wing, permits relatively easy insertion of the fastener clip into a slot formed within the vehicle chassis while providing a relatively high level of extraction force from the vehicle chassis. Assembly of the body panel onto the vehicle chassis requires a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for inserting the body panel into the vehicle chassis may result in fewer injuries to the assembly workers, including injuries related to repetitive stress syndrome. By eliminating conventional screws for fastening to the roof, assembly of the visor and headliner to the roof with the fastener significantly reduces assembly and servicing time and cost. Further, by eliminating multiple fasteners for different sheet metal thicknesses, confusion during assembly is eliminated/reduced since the same type fastener may be used for all slots. Thus, an assembly worker need not worry about selecting the wrong fastener for different slot thicknesses.

The relatively high level of extraction force, characteristic of the fastener clip, securely attaches the body panel, such as an interior trim piece or headliner, to the vehicle chassis such as a roof. Further, the fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals or metal to plastic with respect to the vehicle chassis components and/or between plastic components such as the interior trim panels attached to the metal vehicle chassis. Yet another advantage is that the fastener clip is relatively easy to manufacture using relatively inexpensive manufacturing processes and materials. The use of the fastener clip decreases production costs, increases worker productivity and efficiency and decreases overall vehicle assembly costs. The fastener clip securely attaches any suitable body panel to the vehicle chassis, such that the fastener clip improves reliability both in the short term and in the long term, while further improving vehicle safety and quality.

The fastener clip together with the help of the carrier dampens vibrations and thus eliminates or substantially reduces buzz, squeak, and rattles. The fastener clip and carrier continuously adapt to changes in environmental conditions such as vehicle flexing, vibration and thermal expansion. For example, the fastener clip and carrier may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip and carrier may be made of anti-corrosive material such as plastic or treated metal to provide long reliable service life.

It should be noted that the same reference numbers in the figures may refer to similar aspects in clip assemblies from one or more different embodiments.

FIG. 1 is an exploded view of a first fastener clip assembly, in accordance with some embodiments.

In some embodiments, the fastener clip assembly comprises retainer 1100 and carrier 1200. Carrier 1200 is configured to engage and secure itself into an opening at the bottom of retainer 1100. In some embodiments, carrier 1200 is configured to disengage (upon applying a certain amount of force) and reengage retainer 1100 multiple times.

In some embodiments, retainer 1100 and carrier 1200 are configured to fasten together top surface 1300 and carrier clip housing (or housing) 1400. Housing 1400 may be part of an automobile body panel (housing 1400 may be either attached to or molded onto the body panel) and surface 1300 may be part of an automobile frame. Accordingly, the fastener clip assembly may be configured to fasten a body panel to an automobile chassis/frame.

Receiver 1210 on housing 1400 may be configured to receive carrier 1200 and secure carrier 1200 to housing 1400.

Retainer 1100 is configured to secure itself to surface 1300 by engaging slot 1250. In some embodiments of typical usage, retainer 1100 may be configured to remain attached to surface 1300, and carrier 1200 may be configured to remain attached to housing 1400. In such embodiments, disengagement of the fastener clip assembly may be accomplished by disengaging retainer 1100 from carrier 1200.

In some embodiments, the carrier may comprise a top lip 1110. The top lip 1110 (and optionally a bottom lip) may be configured to form a seal with a top surface, such as surface 1300 (and optionally a bottom surface). A seal may prevent dirt, water, etc. from an environment outside of surface 1300 from entering an environment inside of surface 1300.

In some embodiments, retainer 1100 and carrier 1200 may be manufactured with injection molding using materials such as plastic nylon, polyoxymethylene (POM, also known as acetal), ABS, Polypropylene, rubber materials of various hardness, etc.

In some embodiments, various issues may exist when using metal retainers to engage metal slots, such as the slots in the chassis of a car. The retention between the metal retainer and the metal slot may be unpredictable, for example. Other issues may arise from variances in slot production, the introduction of burrs during the slot creation that may interfere with engagement, alternative chassis materials (such as aluminum), etc. Such issues may introduce excessive variation and inconsistency in the extraction force required. In some embodiments, at least some of the issues may be solved by introducing retainer 1100 and carrier 1200 and configure them such that the main engagement and disengagement of the fastener clip assembly is performed through retainer 1100 and carrier 1200.

Figure 2:
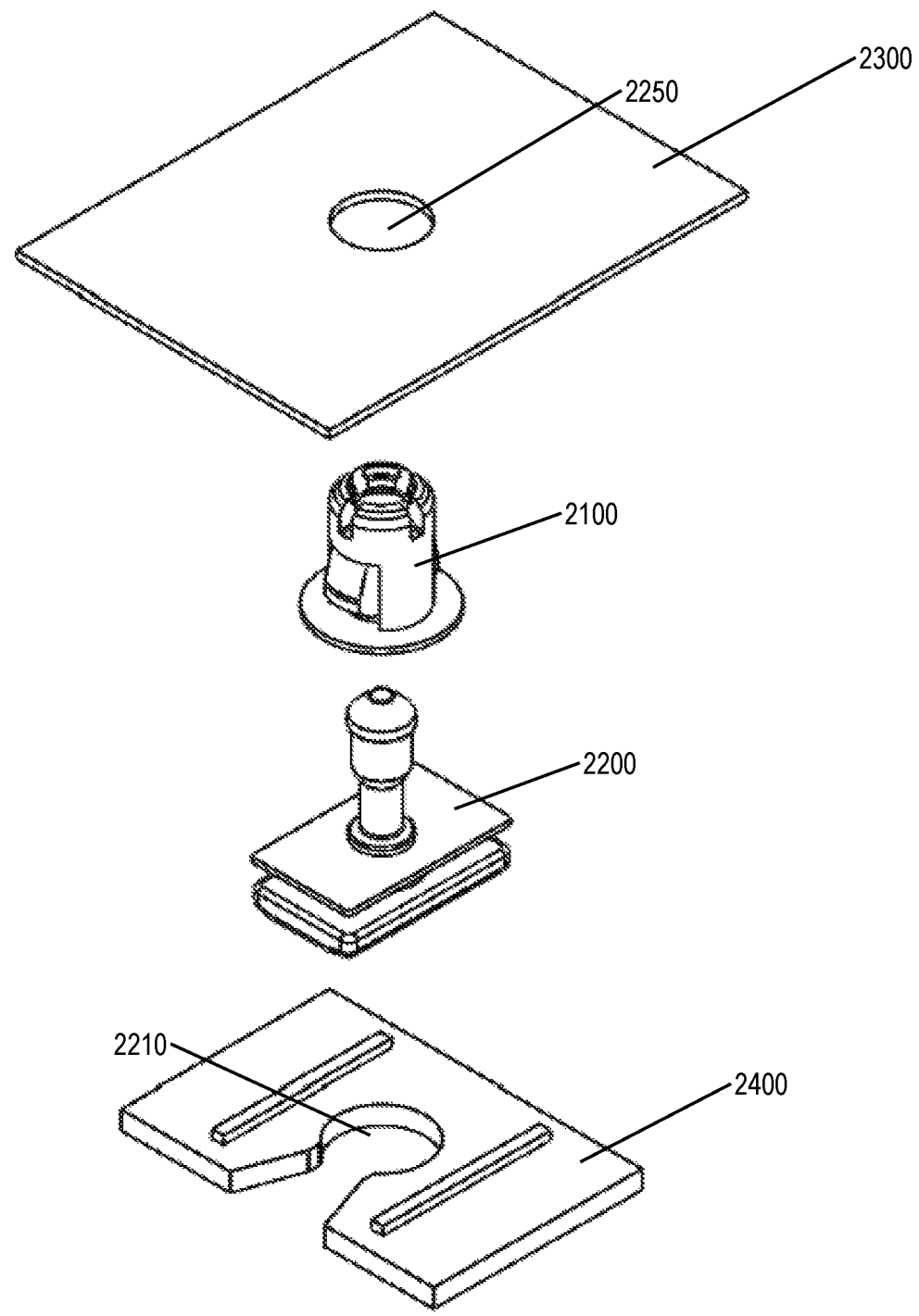
FIG. 2 is an exploded view of a second fastener clip assembly, in accordance with some embodiments.

FIG. 2 is an exploded view of a second fastener clip assembly, in accordance with some embodiments.

In alternative embodiments, the fastener clip assembly comprises retainer 2100 and carrier 2200. Carrier 2200 is configured to engage and secure itself into an opening at the bottom of retainer 2100. In some embodiments, carrier 2200 is configured to disengage (upon applying a certain amount of force) and reengage retainer 2100 multiple times.

In some embodiments, retainer 2100 and carrier 2200 are configured to fasten together top surface 2300 and engagement housing (or housing) 2400. Housing 2400 may be part of an automobile body panel (housing 2400 may be either attached to or molded onto the body panel) and surface 2300 may be part of an automobile chassis/frame. Accordingly, the fastener clip assembly may be configured to fasten a body panel to an automobile frame.

Opening 2210 on housing 2400 may be configured to receive carrier 2200 and secure carrier 2200 to housing 2400.

Retainer 2100 is configured to secure itself to surface 2300 by engaging slot 2250. In some embodiments of typical usage, retainer 2100 may be configured to remain attached to surface 2300, and carrier 2200 may be configured to remain attached to housing 2400. In such embodiments, disengagement of the fastener clip assembly may be accomplished by disengaging retainer 2100 from carrier 2200.

In some embodiments, retainer 2100 and carrier 2200 may be manufactured with injection molding using materials such as plastic nylon, polyoxymethylene (POM, also known as acetal), ABS, Polypropylene, rubber materials of various hardness, etc.

In some embodiments, various issues may exist when using metal retainers to engage metal slots, such as the slots in the chassis of a car. The retention between the metal retainer and the metal slot may be unpredictable, for example. Other issues may arise from variances in slot production, the introduction of burrs during the slot creation that may interfere with engagement, alternative chassis materials (such as aluminum), etc. Such issues may introduce excessive variation and inconsistency in the extraction force required. In some embodiments, at least some of the issues may be solved by introducing retainer 2100 and carrier 2200 and configure them such that the main engagement and disengagement of the fastener clip assembly is performed through retainer 2100 and carrier 2200.

Figure 3:
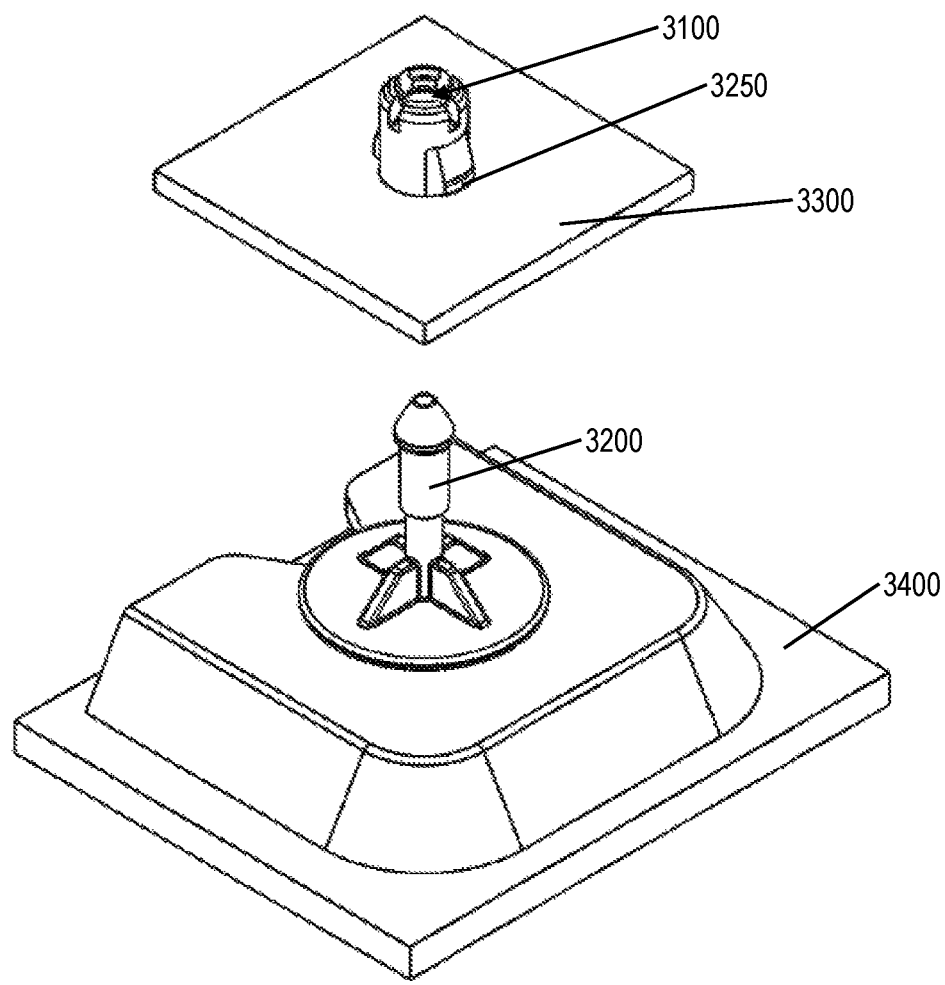
FIG. 3 is an exploded view of a third fastener clip, in accordance with some embodiments.

FIG. 3 is an exploded view of a third fastener clip, in accordance with some embodiments.

In some embodiments, the fastener clip assembly comprises retainer 3100 and carrier 3200. Carrier 3200 is configured to engage and secure itself into an opening at the bottom of retainer 3100. In some embodiments, carrier 3200 is configured to disengage (upon applying a certain amount of force) and reengage retainer 3100 multiple times.

In some embodiments, retainer 3100 and carrier 3200 are configured to fasten together top surface 3300 and carrier clip housing (or housing) 3400. Housing 3400 may be part of an automobile body panel (housing 3400 may be either attached to or molded onto the body panel) and surface 3300 may be part of an automobile frame. Accordingly, the fastener clip assembly may be configured to fasten a body panel to an automobile chassis/frame.

Receiver 3210 on housing 3400 may be configured to receive carrier 3200 and secure carrier 3200 to housing 3400.

Retainer 3100 is configured to secure itself to surface 3300 by engaging slot 3250. In some embodiments of typical usage, retainer 3100 may be configured to remain attached to surface 3300, and carrier 3200 may be configured to remain attached to housing 3400. In such embodiments, disengagement of the fastener clip assembly may be accomplished by disengaging retainer 3100 from carrier 3200.

In some embodiments, retainer 3100 and carrier 3200 may be manufactured with injection molding using materials such as plastic nylon, polyoxymethylene (POM, also known as acetal), ABS, Polypropylene, rubber materials of various hardness, etc.

In some embodiments, various issues may exist when using metal retainers to engage metal slots, such as the slots in the chassis of a car. The retention between the metal retainer and the metal slot may be unpredictable, for example. Other issues may arise from variances in slot production, the introduction of burrs during the slot creation that may interfere with engagement, alternative chassis materials (such as aluminum), etc. Such issues may introduce excessive variation and inconsistency in the extraction force required. In some embodiments, at least some of the issues may be solved by introducing retainer 3100 and carrier 3200 and configure them such that the main engagement and disengagement of the fastener clip assembly is performed through retainer 3100 and carrier 3200.

Figure 4:
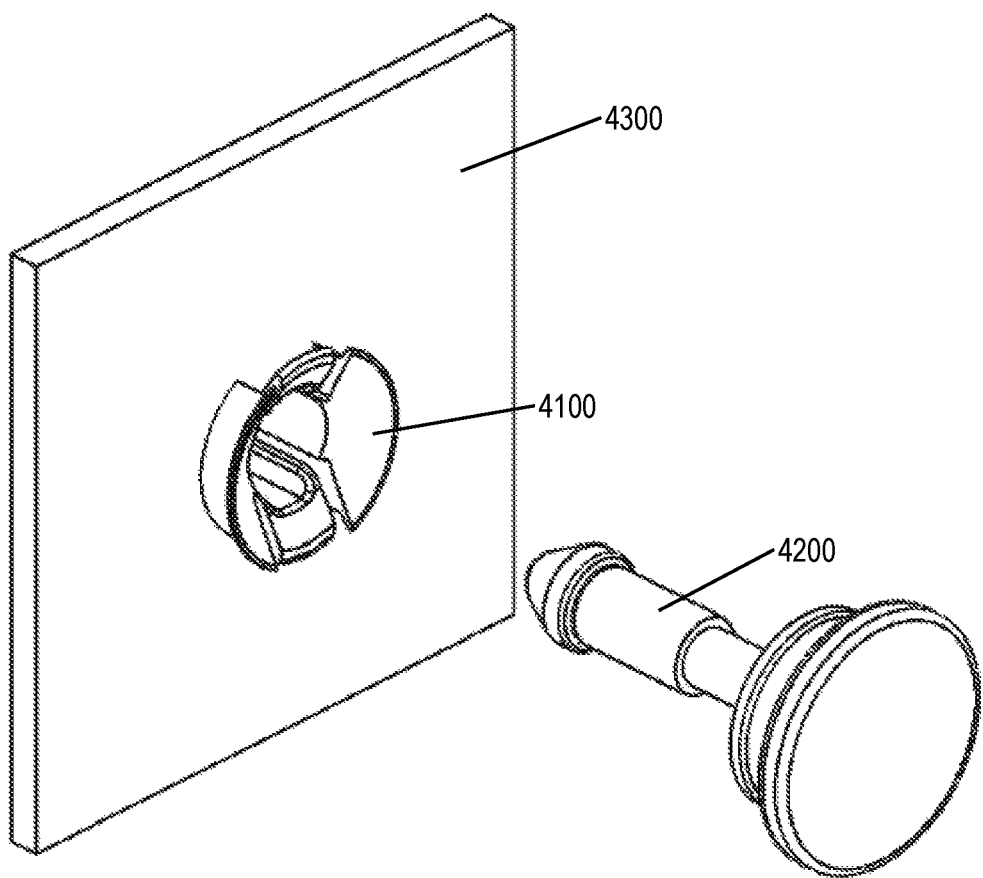
FIG. 4 is a exploded view of a fourth fastener clip, in accordance with some embodiments.

FIG. 4 is a exploded view of a fourth fastener clip, in accordance with some embodiments.

In some embodiments, the fastener clip assembly comprises retainer 4100 and carrier 4200. Carrier 4200 is configured to engage and secure itself into an opening at the bottom of retainer 4100. In some embodiments, carrier 4200 is configured to disengage (upon applying a certain amount of force) and reengage retainer 4100 multiple times.

In some embodiments, retainer 4100 and carrier 4200 are configured to fasten together top surface 4300 and carrier clip housing (or housing) 4400. Housing 4400 may be part of an automobile body panel (housing 4400 may be either attached to or molded onto the body panel) and surface 4300 may be part of an automobile frame. Accordingly, the fastener clip assembly may be configured to fasten a body panel to an automobile chassis/frame.

Receiver 4210 on housing 4400 may be configured to receive carrier 4200 and secure carrier 4200 to housing 4400.

Retainer 4100 is configured to secure itself to surface 4300 by engaging slot 4250. In some embodiments of typical usage, retainer 4100 may be configured to remain attached to surface 4300, and carrier 4200 may be configured to remain attached to housing 4400. In such embodiments, disengagement of the fastener clip assembly may be accomplished by disengaging retainer 4100 from carrier 4200.

In some embodiments, retainer 4100 and carrier 4200 may be manufactured with injection molding using materials such as plastic nylon, polyoxymethylene (POM, also known as acetal), ABS, Polypropylene, rubber materials of various hardness, etc.

In some embodiments, various issues may exist when using metal retainers to engage metal slots, such as the slots in the chassis of a car. The retention between the metal retainer and the metal slot may be unpredictable, for example. Other issues may arise from variances in slot production, the introduction of burrs during the slot creation that may interfere with engagement, alternative chassis materials (such as aluminum), etc. Such issues may introduce excessive variation and inconsistency in the extraction force required. In some embodiments, at least some of the issues may be solved by introducing retainer 4100 and carrier 4200 and configure them such that the main engagement and disengagement of the fastener clip assembly is performed through retainer 4100 and carrier 4200.

Figure 5:
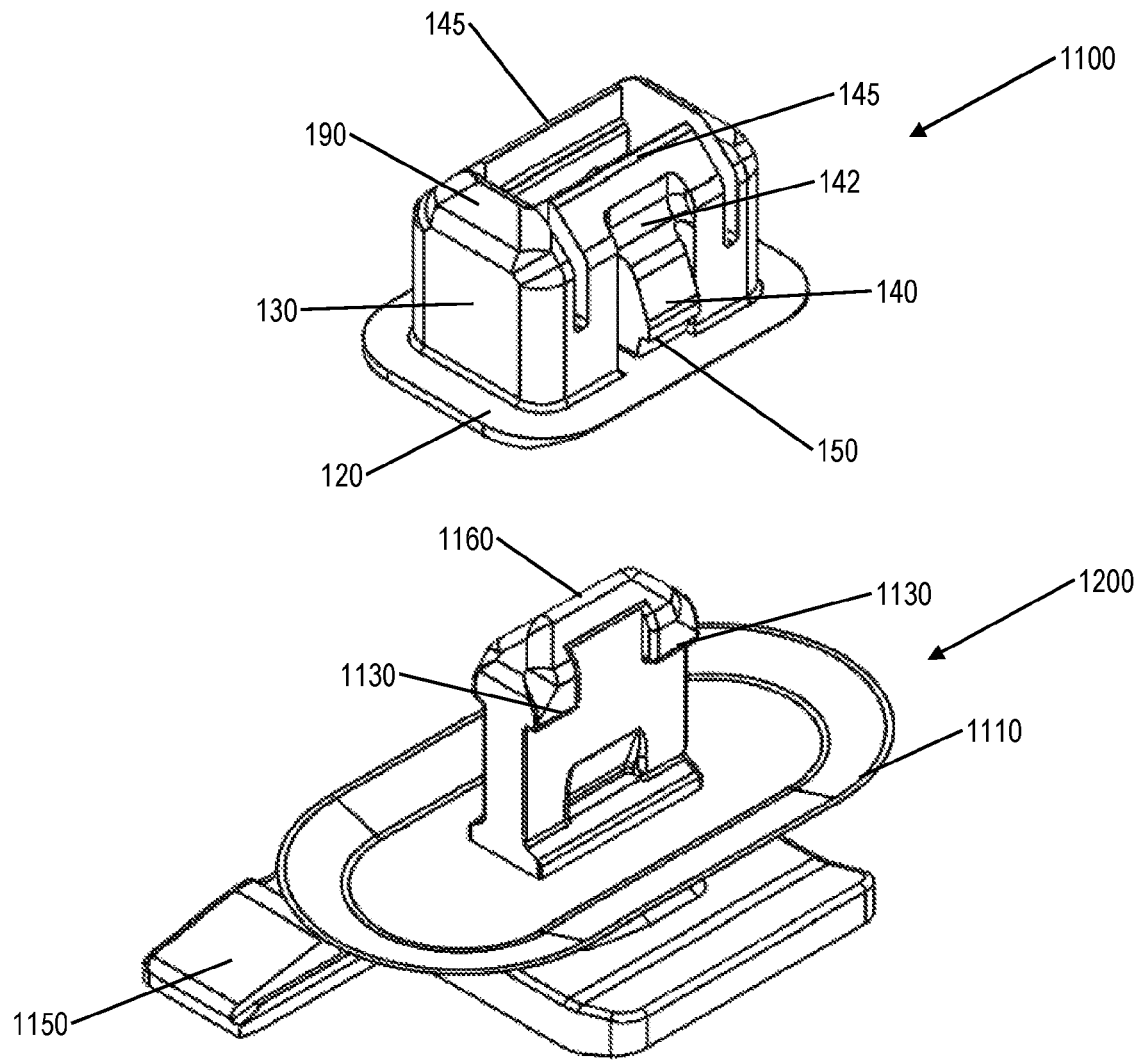
FIG. 5 is a perspective view of a retainer and carrier for a first clip, in accordance with some embodiments.

FIG. 5 is a perspective view of a retainer and carrier for a first clip, in accordance with some embodiments.

Retainer 1100 includes base 120 extending from sidewall 130. Sidewall 130 extends down from top portion 190. Retainer 1100 includes wings 140; in some embodiments, one on each side of retainer 1100. Wings 140 may have an engagement region 150, which is configured to engage a slot in a surface to which retainer 1100 is configured to attach. The top portion 190 may slope down toward the sides of retainer 1100 such that the retainer may be inserted more easily into such a slot. It should be noted that retainer 1100, in some embodiments, may include any number of wings.

The wings 140 have a size, such as a width, length, thickness and a pivot point 142 to provide very high extraction force levels while the insertion force level is relatively very low. Additionally, the width of the wing 140 may be increased to further increase the strength of the wing and thus increase the extraction force, as well as increase the size of the engagement region. Alternatively, the width of the wing may be decreased, or the wings may have different widths and engagement regions 150 to achieve any desired insertion force or extraction force. In some embodiments, retainer 1100 may be configured to remain engaged to the slot once inserted.

In some embodiments, retainer 1100 may also include bendable tabs 145, which are configured to spread apart upon insertion of carrier 1200 through the bottom of retainer 1100. Upon returning to their original position, bendable tabs 145 are configured to retain carrier 1200 and only release carrier 1200 upon the exertion of a certain amount of force.

In some embodiments, carrier 1200 is configured to receive retainer 1100, which is configured to fit over and attach to carrier 1200. In some embodiments, the carrier may comprise a lip 1110 configured to form a seal against a surface to which retainer 1100 is attached.

In some embodiments, carrier 1200 may also comprise a top surface 1160, which may be cone-shaped to aid the engagement of carrier 1200 into retainer 1100. Retaining ledges 1130 on the carrier are configured to engage bending tabs 145 in order to secure the retainer to the carrier when the carrier is inserted into the retainer.

In some embodiments, carrier 1200 is configured to secure itself onto a housing using hook 1150. Hook 1150 is configured to slide into a corresponding receiver in the housing in order to secure the carrier to the housing. In some embodiments, the housing may be attached or molded into a body panel, for example, that is to be attached to an automobile chassis.

Figure 6:
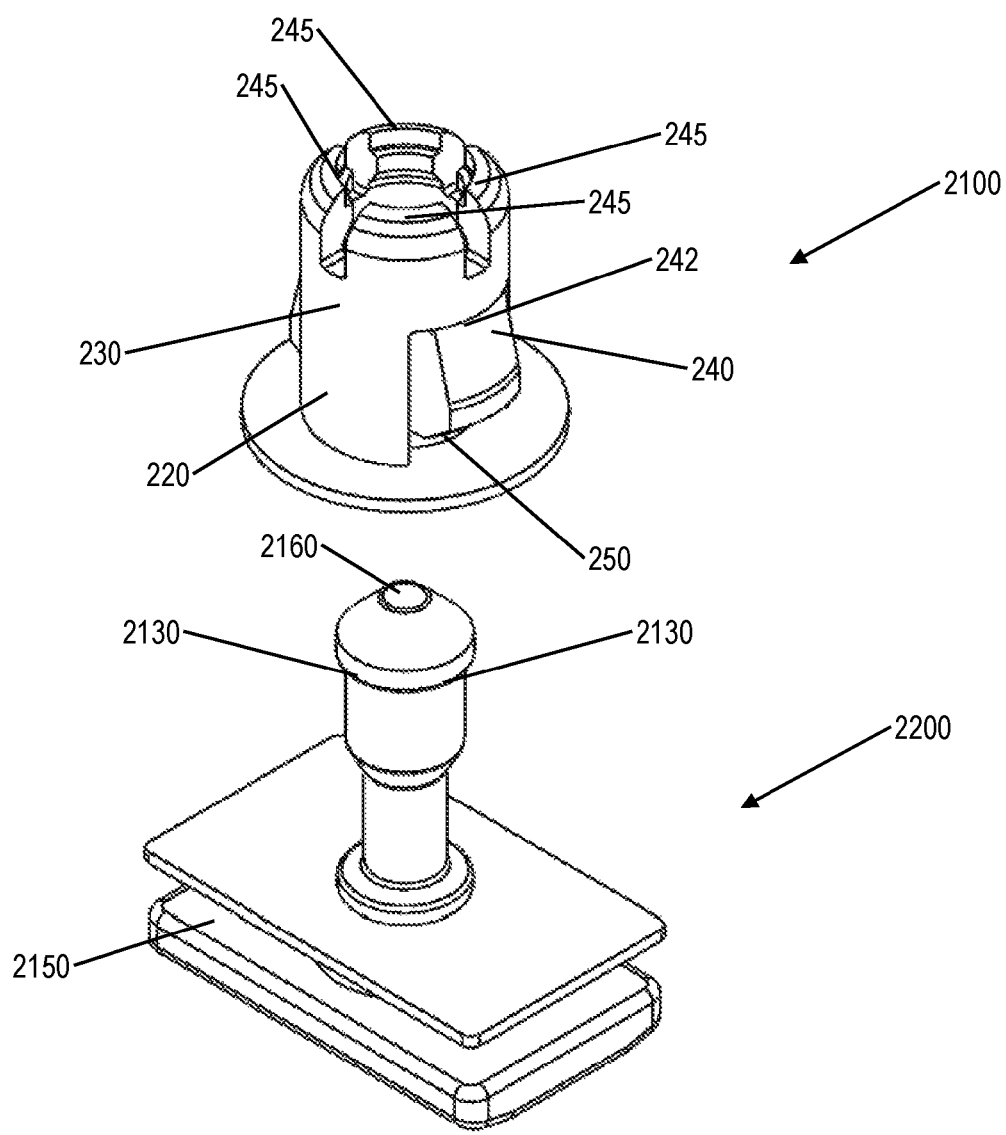
FIG. 6 is a perspective view of a retainer and carrier for a second clip, in accordance with some embodiments.

FIG. 6 is a perspective view of a retainer and carrier for a second clip, in accordance with some embodiments.

Retainer 2100 includes base 220 extending from sidewall 230. Sidewall 230 extends down from top portion 290. Retainer 2100 includes wings 240; in some embodiments, one on each side of retainer 2100. Wings 240 may have an engagement region 250, which is configured to engage a slot in a surface to which retainer 2100 is configured to attach. The top portion 290 may slope down toward the sides of retainer 2100 such that the retainer may be inserted more easily into such a slot. It should be noted that retainer 2100, in some embodiments, may include any number of wings.

The wings 240 have a size, such as a width, length, thickness and a pivot point 242 to provide very high extraction force levels while the insertion force level is relatively very low. Additionally, the width of the wing 240 may be increased to further increase the strength of the wing and thus increase the extraction force, as well as increase the size of the engagement region. Alternatively, the width of the wing may be decreased, or the wings may have different widths and engagement regions 250 to achieve any desired insertion force or extraction force. In some embodiments, retainer 2100 may be configured to remain engaged to the slot once inserted.

In some embodiments, retainer 2100 may also include bendable tabs 245, which are configured to spread apart upon insertion of carrier 2200 through the bottom of retainer 2100. Upon returning to their original position, bendable tabs 245 are configured to retain carrier 2200 and only release carrier 2200 upon the exertion of a certain amount of force.

In some embodiments, carrier 2200 is configured to receive retainer 2100, which is configured to fit over and attach to carrier 2200.

In some embodiments, carrier 2200 may also comprise a top surface 2160, which may be cone-shaped to aid the engagement of carrier 2200 into retainer 2100. Retaining ledges 2130 on the carrier are configured to engage bending tabs 245 in order to secure the retainer to the carrier when the carrier is inserted into the retainer.

In some embodiments, carrier 2200 is configured to secure itself onto a housing using groove 2150. Groove 2150 is configured to slide into a corresponding receiver in the housing in order to secure the carrier to the housing. In some embodiments, the housing may be attached or molded into a body panel, for example, that is to be attached to an automobile chassis.

Figure 7:
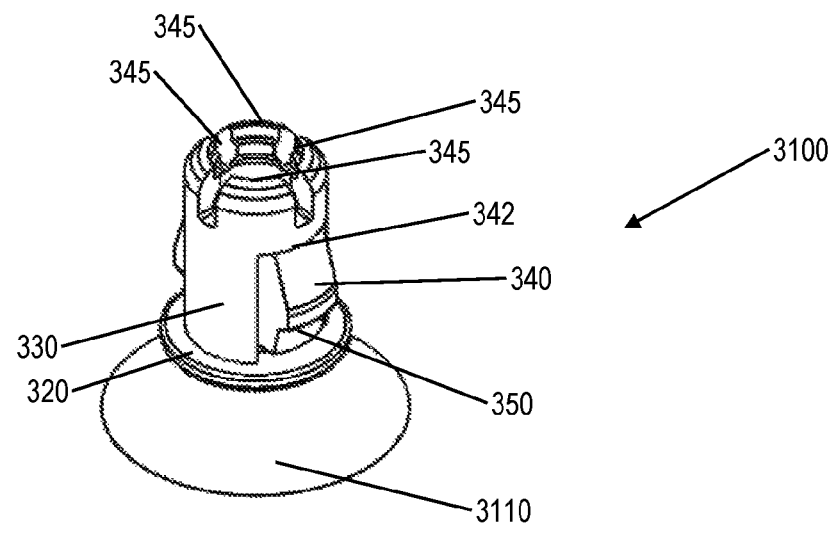
FIG. 7 is a perspective view of a retainer and carrier for a third clip, in accordance with some embodiments.
Figure 7:
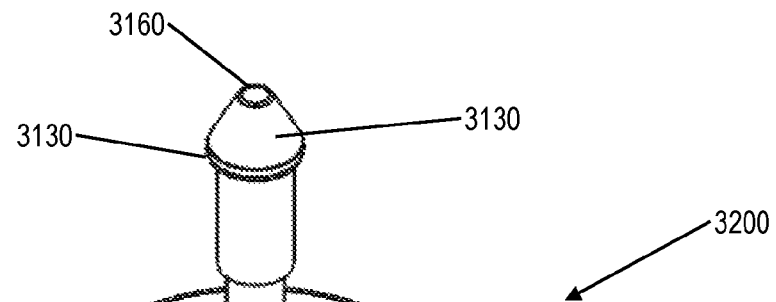

FIG. 7 is a perspective view of a retainer and carrier for a third clip, in accordance with some embodiments.

Retainer 3100 includes base 320 extending from sidewall 330. Sidewall 330 extends down from top portion 390. Retainer 3100 includes wings 340; in some embodiments, one on each side of retainer 3100. Wings 340 may have an engagement region 350, which is configured to engage a slot in a surface to which retainer 3100 is configured to attach. The top portion 390 may slope down toward the sides of retainer 3100 such that the retainer may be inserted more easily into such a slot. It should be noted that retainer 3100, in some embodiments, may include any number of wings.

The wings 340 have a size, such as a width, length, thickness and a pivot point 342 to provide very high extraction force levels while the insertion force level is relatively very low. Additionally, the width of the wing 340 may be increased to further increase the strength of the wing and thus increase the extraction force, as well as increase the size of the engagement region. Alternatively, the width of the wing may be decreased, or the wings may have different widths and engagement regions 350 to achieve any desired insertion force or extraction force. In some embodiments, retainer 3100 may be configured to remain engaged to the slot once inserted.

In some embodiments, retainer 3100 may also include bendable tabs 345, which are configured to spread apart upon insertion of carrier 3200 through the bottom of retainer 3100. Upon returning to their original position, bendable tabs 345 are configured to retain carrier 3200 and only release carrier 3200 upon the exertion of a certain amount of force.

In some embodiments, carrier 3200 is configured to receive retainer 3100, which is configured to fit over and attach to carrier 3200. In some embodiments, the retainer may comprise a lip 3110 configured to form a seal against a bottom surface to which the clip assembly attaches.

In some embodiments, carrier 3200 may also comprise a top surface 3160, which may be cone-shaped to aid the engagement of carrier 3200 into retainer 3100. Retaining ledges 3130 on the carrier are configured to engage bending tabs 345 in order to secure the retainer to the carrier when the carrier is inserted into the retainer.

In some embodiments, carrier 3200 is configured to secure itself onto a housing using groove 3150. Groove 3150 is configured to slide into a corresponding receiver in the housing in order to secure the carrier to the housing. In some embodiments, the housing may be attached or molded into a body panel, for example, that is to be attached to an automobile chassis.

Figure 8:
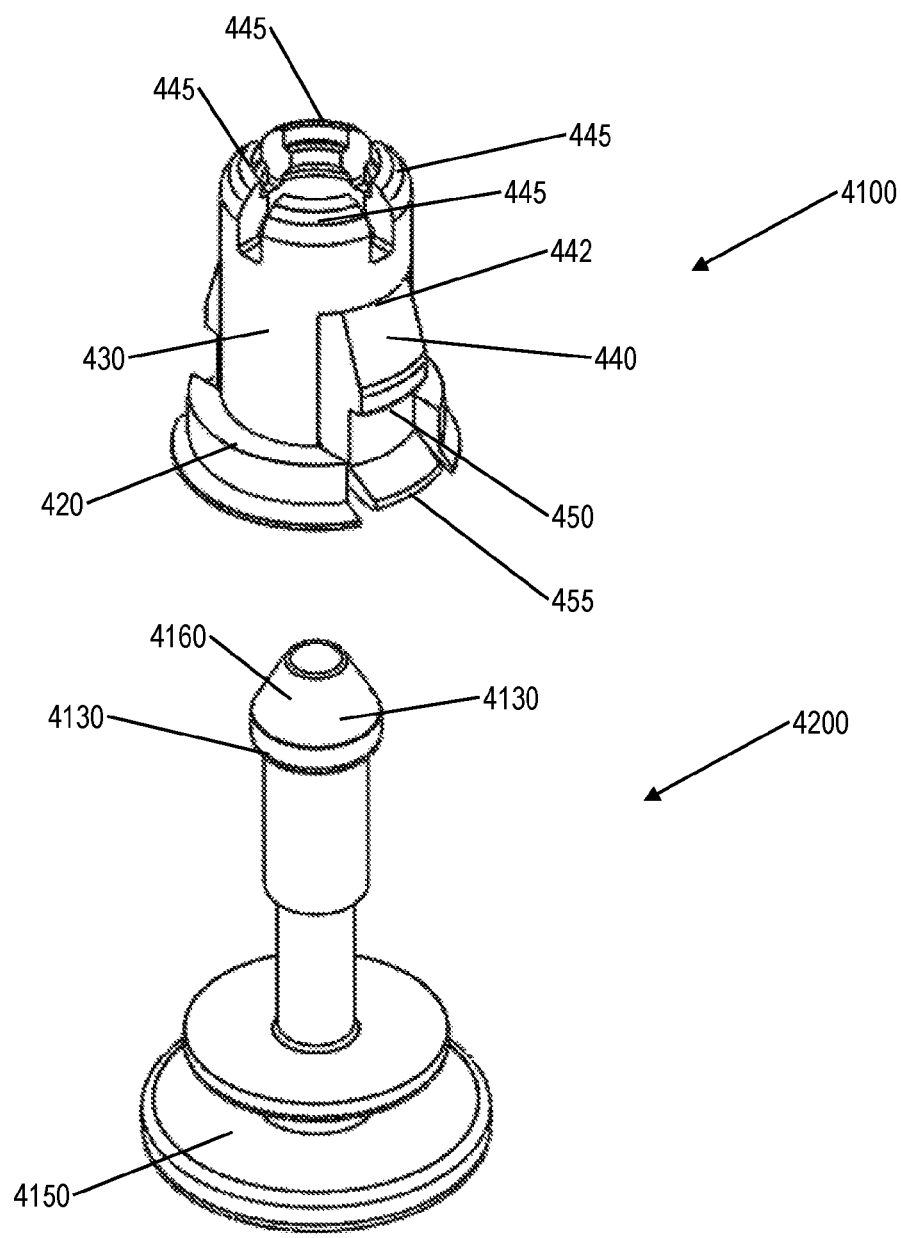
FIG. 8 is a perspective view of a retainer and carrier for a fourth clip, in accordance with some embodiments.

FIG. 8 is a perspective view of a retainer and carrier for a fourth clip, in accordance with some embodiments.

Retainer 4100 includes base 420 extending from sidewall 430. Sidewall 430 extends down from top portion 490. Retainer 4100 includes wings 440; in some embodiments, one on each side of retainer 4100. Wings 440 may have an engagement region 450, which is configured to engage a slot in a surface to which retainer 4100 is configured to attach. The top portion 490 may slope down toward the sides of retainer 4100 such that the retainer may be inserted more easily into such a slot. It should be noted that retainer 4100, in some embodiments, may include any number of wings.

The wings 440 have a size, such as a width, length, thickness and a pivot point 442 to provide very high extraction force levels while the insertion force level is relatively very low. Additionally, the width of the wing 440 may be increased to further increase the strength of the wing and thus increase the extraction force, as well as increase the size of the engagement region. Alternatively, the width of the wing may be decreased, or the wings may have different widths and engagement regions 450 to achieve any desired insertion force or extraction force. In some embodiments, retainer 4100 may be configured to remain engaged to the slot once inserted.

In some embodiments, retainer 4100 may also include bendable tabs 445, which are configured to spread apart upon insertion of carrier 4200 through the bottom of retainer 4100. Upon returning to their original position, bendable tabs 445 are configured to retain carrier 4200 and only release carrier 4200 upon the exertion of a certain amount of force.

In some embodiments, carrier 4100 may also include releases 455. Releases 455 may be configured to release carrier 4100 from a slot to which the carrier may be attached by depressing wings 440 inwards. It should be noted that, in some embodiments, that when engaged, wings 440 may be inaccessible from one side of the surface/slot. Accordingly, releases 455 may be used to release carrier 4100 from the slot/surface when wings 440 are otherwise inaccessible.

In some embodiments, carrier 4200 is configured to receive retainer 4100, which is configured to fit over and attach to carrier 4200.

In some embodiments, carrier 4200 may also comprise a top surface 4160, which may be cone-shaped to aid the engagement of carrier 4200 into retainer 4100. Retaining ledges 4130 on the carrier are configured to engage bending tabs 445 in order to secure the retainer to the carrier when the carrier is inserted into the retainer.

In some embodiments, carrier 4200 is configured to secure itself onto a housing using groove 4150. Groove 4150 is configured to slide into a corresponding receiver in the housing in order to secure the carrier to the housing. In some embodiments, the housing may be attached or molded into a body panel, for example, that is to be attached to an automobile chassis.

Figure 9:
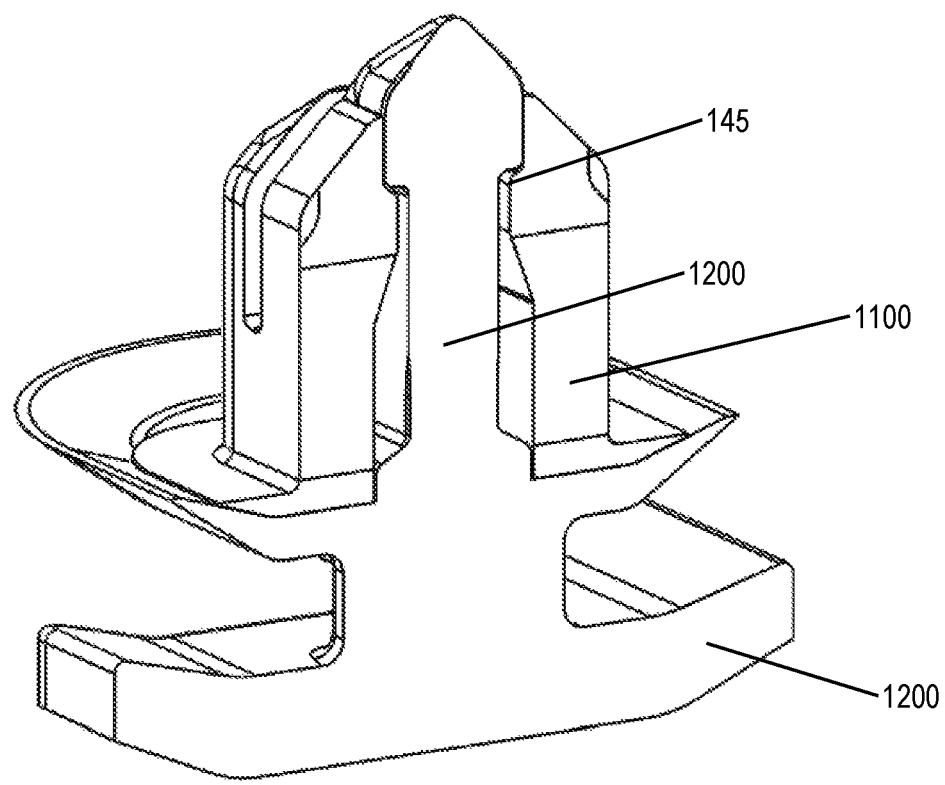
FIG. 9 is a perspective view of a first clip in the engaged position, in accordance with some embodiments.

FIG. 9 is a perspective view of a first clip in the engaged position, in accordance with some embodiments.

In this figure, retainer 1100 and carrier 1200 are seen engaged together. Bendable tabs 145 are configured to spread open upon the insertion of carrier 1200 into retainer 1100 and then return to their original position in order to secure carrier 1200 to retainer 1100.

Retainer 1100 and carrier 1200 are designed to engage and connect to each other, and by doing so couple together the part attached to the retainer and the part attached to the carrier. Be applying a certain amount of force, the carrier is designed to disengage from the retainer. The retainer and the carrier may be configured to engage and disengage from each other multiple times.

Figure 10:
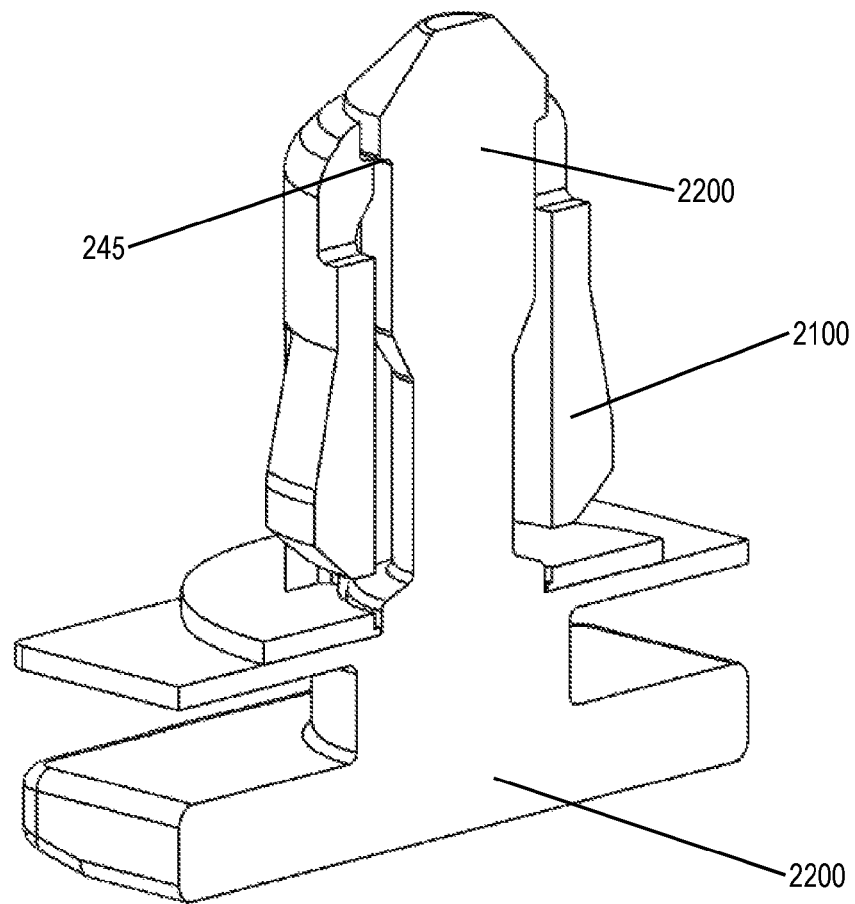
FIG. 10 is a perspective view of a second clip in the engaged position, in accordance with some embodiments.

FIG. 10 is a perspective view of a second clip in the engaged position, in accordance with some embodiments.

In this figure, retainer 2100 and carrier 2200 are seen engaged together. Bendable tabs 245 are configured to spread open upon the insertion of carrier 2200 into retainer 2100 and then return to their original position in order to secure carrier 2200 to retainer 2100.

Retainer 2100 and carrier 2200 are designed to engage and connect to each other, and by doing so couple together the part attached to the retainer and the part attached to the carrier. Be applying a certain amount of force, the carrier is designed to disengage from the retainer. The retainer and the carrier may be configured to engage and disengage from each other multiple times.

Figure 11:
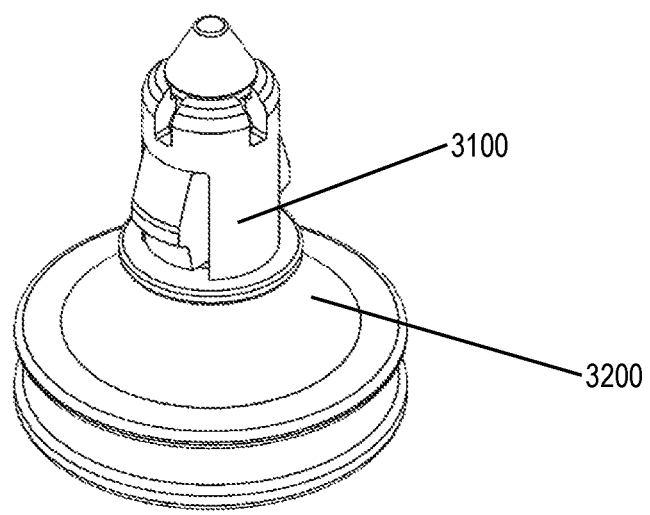
FIG. 11 is a perspective view of a third clip in the engaged position, in accordance with some embodiments.

FIG. 11 is a perspective view of a third clip in the engaged position, in accordance with some embodiments.

In this figure, retainer 3100 and carrier 3200 are seen engaged together. Bendable tabs 345 are configured to spread open upon the insertion of carrier 3200 into retainer 3100 and then return to their original position in order to secure carrier 3200 to retainer 3100.

Retainer 3100 and carrier 3200 are designed to engage and connect to each other, and by doing so couple together the part attached to the retainer and the part attached to the carrier. Be applying a certain amount of force, the carrier is designed to disengage from the retainer. The retainer and the carrier may be configured to engage and disengage from each other multiple times.

Figure 12:
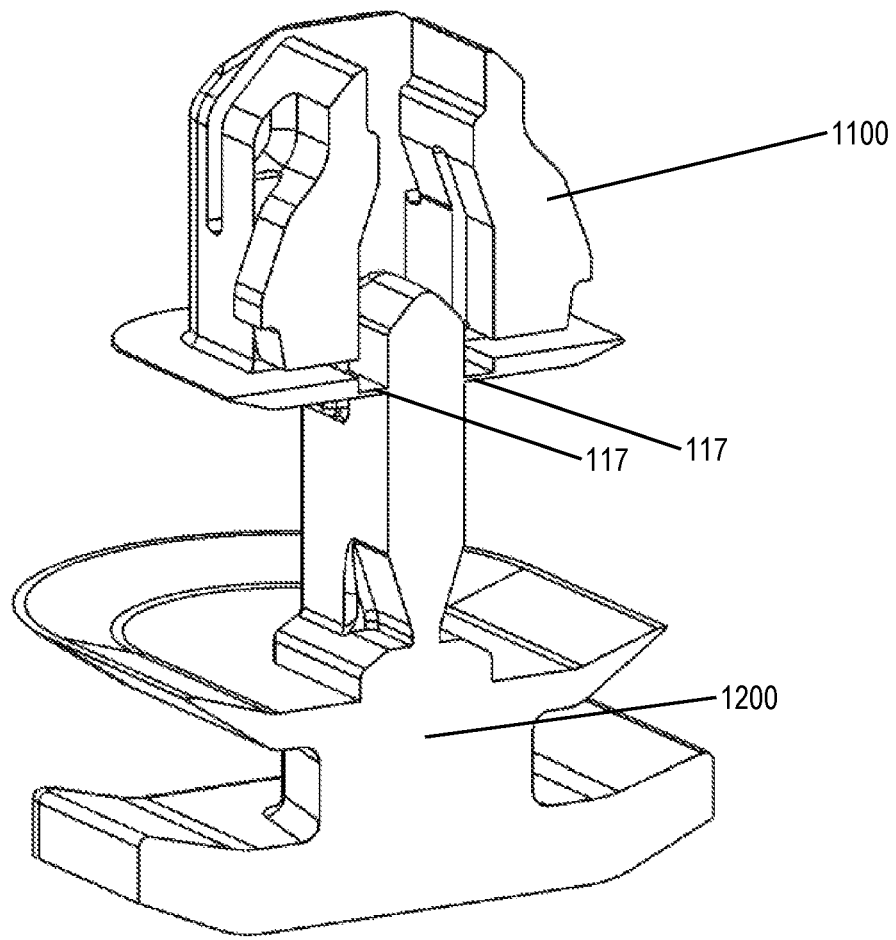
FIG. 12 is a perspective view of a molded first fastener clip, in accordance with some embodiments.

FIG. 12 is a perspective view of a molded first fastener clip, in accordance with some embodiments.

In some embodiments, retainer 1100 and carrier 1200 may be molded together in one molded piece. Retainer 1100 and carrier 1200 may be coupled together during the molding process by frangible link/web 117. Frangible link 117 may be configured to hold retainer 1100 and carrier 1200 together until the pieces are to be used as part of a fastener clip assembly. The frangible link may be of the same material as the retainer and the carrier, but the frangible may be constructed to be considerably weaker (for example, by being much thinner) and thus easier to break relative to the components that the link is keeping connected.

In some embodiments, frangible link 117 may be designed to break during first assembly.

Retainer 1100 and carrier 1200 may be used as part of a clip assembly to secure a body panel to an automobile chassis, for example. Carrier 1200 (or multiple carriers) with retainer 1100 still connected may be first attached to a housing on a body panel. Then the body panel may be pressed towards corresponding slots made into the chassis where the body panel is to be attached.

In some embodiments, during the first assembly between the body panel and the chassis, the frangible link is designed to break as it is molded to be weaker than the other pieces. Accordingly, in one step during the first assembly, the frangible link breaks, retainer 1100 engages and attaches to the chassis slot, and carrier 1200 engages and attaches to retainer 1100.

Figure 13:
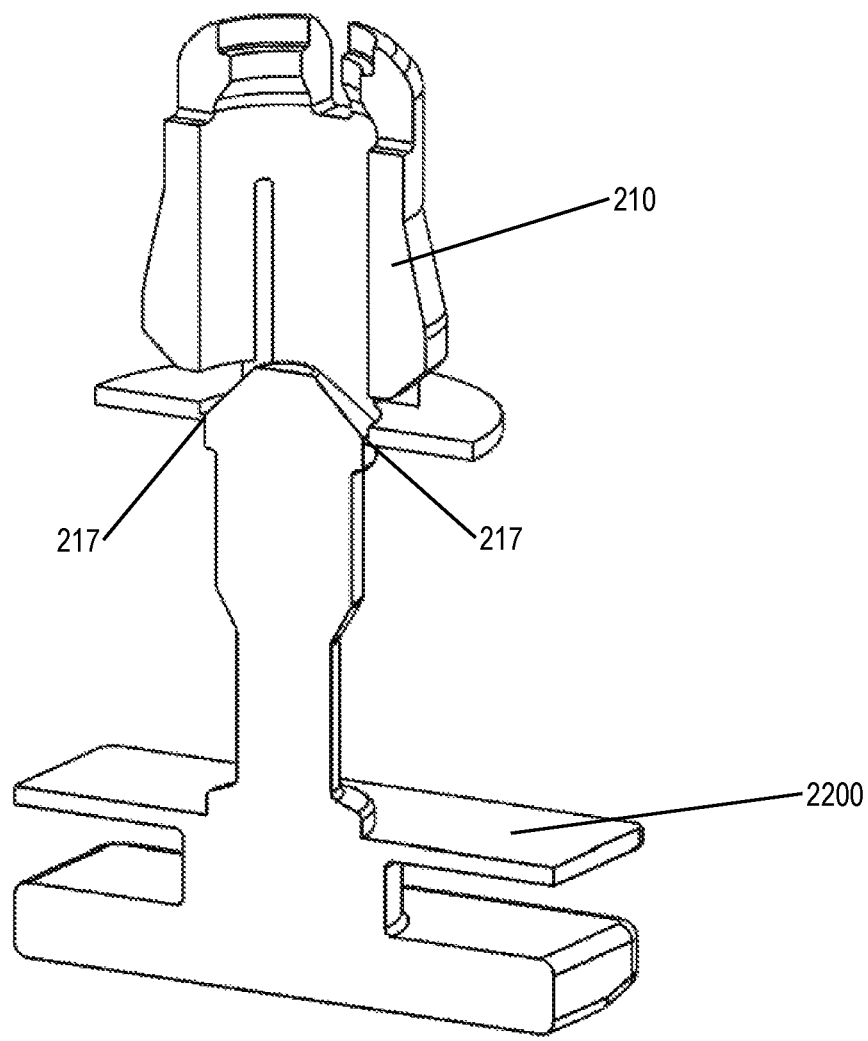
FIG. 13 is a perspective view of a molded second fastener clip, in accordance with some embodiments.

FIG. 13 is a perspective view of a molded second fastener clip, in accordance with some embodiments.

In some embodiments, retainer 2100 and carrier 2200 may be molded together in one molded piece. Retainer 2100 and carrier 2200 may be coupled together during the molding process by frangible link/web 217. Frangible link 217 may be configured to hold retainer 2100 and carrier 2200 together until the pieces are to be used as part of a fastener clip assembly. The frangible link may be of the same material as the retainer and the carrier, but the frangible may be constructed to be considerably weaker (for example, by being much thinner) and thus easier to break relative to the components that the link is keeping connected.

In some embodiments, frangible link 217 may be designed to break during first assembly.

Retainer 2100 and carrier 2200 may be used as part of a clip assembly to secure a body panel to an automobile chassis, for example. Carrier 2200 (or multiple carriers) with retainer 2100 still connected may be first attached to a housing on a body panel. Then the body panel may be pressed towards corresponding slots made into the chassis where the body panel is to be attached.

In some embodiments, during the first assembly between the body panel and the chassis, the frangible link is designed to break as it is molded to be weaker than the other pieces. Accordingly, in one step during the first assembly, the frangible link breaks, retainer 2100 engages and attaches to the chassis slot, and carrier 2200 engages and attaches to retainer 2100.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip assembly comprising:
   a retainer; and
   a carrier,
      wherein the retainer is configured to engage and be secured to a slot in a chassis, wherein the carrier is configured to engage and be secured to a body panel, wherein the retainer is configured to engage and be secured to the carrier,
      wherein the retainer is pre-attached to the carrier with a frangible link, wherein the retainer is configured to engage and be secured to the carrier based at least upon breaking the frangible link, wherein breaking the frangible link is based at least upon pressing the retainer toward the carrier.

2. The fastener clip assembly of claim 1, wherein the retainer and the carrier are manufactured pre-attached with the frangible link using an injection molding process.

3. The fastener clip assembly of claim 1, wherein the retainer is configured to engage and be attached to the slot based at least upon pressing the retainer toward the slot.

4. The fastener clip system of claim 1, wherein the carrier is configured to engage and be attached to a housing on the body panel.

5. A method, the method comprising:
   engaging and securing together a retainer and a carrier based at least upon breaking a frangible link, wherein the frangible link is configured to pre-attach the retainer to the carrier, wherein breaking the frangible link is based at least upon pressing together the retainer and the carrier,
      wherein the retainer is configured to engage and be secured to a slot in a chassis, wherein the carrier is configured to engage and be secured to a body panel, wherein the retainer is configured to engage and be secured to the carrier.

6. The method of claim 5, further comprising manufacturing the retainer and the carrier pre-attached with the frangible link using an injection molding process.

7. The method of claim 5, wherein the retainer is configured to engage and be attached to the slot based at least upon pressing the retainer toward the slot.

8. The method of claim 5, wherein the carrier is configured to engage and be attached to a housing on the body panel.

9. A fastener clip system comprising:
   a body panel comprising a housing attached to the body panel;
   a carrier configured to attach to the housing;
   a retainer configured to engage and be attached to the carrier; and
   a chassis section comprising a slot, wherein the retainer is configured to engage and be attached to the chassis through the slot,
      wherein the retainer is pre-attached to the carrier with a frangible link, wherein the retainer is configured to engage and be secured to the carrier based at least upon breaking the frangible link, wherein breaking the frangible link is based at least upon pressing the retainer toward the carrier.

10. The fastener clip system of claim 9, wherein the retainer and the carrier are manufactured pre-attached with the frangible link using an injection molding process.

11. The fastener clip system of claim 9, wherein the retainer is configured to engage and be attached to the slot based at least upon pressing the retainer toward the slot.

12. The fastener clip system of claim 9, wherein the carrier is configured to engage and be attached to a housing on the body panel.

* * * * *